(No Model.)
R. J. HAMILL.
DRIVE CHAIN.
No. 514,001. Patented Feb. 6, 1894.
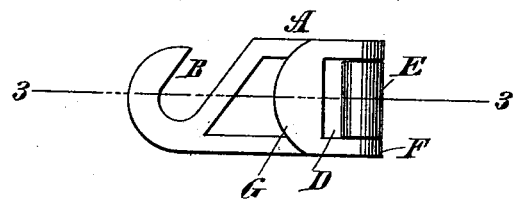
Fig. I.
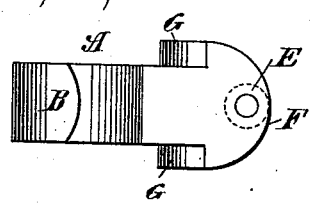
Fig. II.
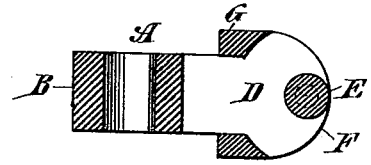
Fig. III.
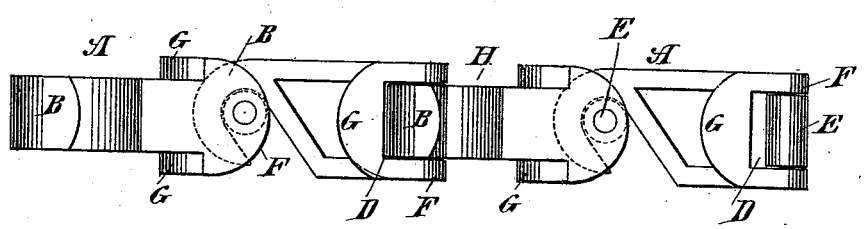
Fig. IV.
WITNESSES:
William Goebel.
M. V. Bidgood
INVENTOR
Robert J. Hamill
BY
ATTORNEYS

UNITED STATES PATENT OFFICE.

ROBERT J. HAMILL, OF CHICAGO, ILLINOIS.

DRIVE-CHAIN.

SPECIFICATION forming part of Letters Patent No. 514,001, dated February 6, 1894.

Application filed January 14, 1893. Serial No. 458,377. (No model.)

*To all whom it may concern:*

Be it known that I, ROBERT J. HAMILL, a citizen of the United States, residing at Chicago, county of Cook, State of Illinois, have invented certain new and useful Improvements in Drive-Chains, of which the following is a specification.

My invention relates more particularly to that class of drive chains that operate with a sprocket wheel having two rows of sprockets to embrace or straddle the links of the chain.

The object of my invention is to provide improved chain links adapted to be interchangeably connected together which links will present double wearing faces or lugs to the sprockets of the wheel in whichever position the links are placed, and capable of working on sprocket wheels, revolving either in the same or different planes to each other.

The invention consists in the novel details of improvement and the combinations of parts that will be more fully hereinafter set forth and then pointed out in the claims.

Reference is to be had to the accompanying drawings forming part hereof wherein—

Figure I is a side view of one of my improved chain links. Fig. II is a side view thereof taken at right angles to that shown in Fig. I. Fig. III is a longitudinal sectional view on the plane of the line 3, 3, in Fig. I. Fig. IV is a plan view of a portion of a chain composed of my improved links showing how the links are connected together.

In the accompanying drawings, the letter A indicates my improved chain link whose body portion may be of suitable construction preferably skeleton-like. At one end the link A has a hook or the like B that preferably extends at an acute angle to the longitudinal axis of the link. (See Fig. I.) At the end opposite the hook B, the link A has an opening D adapted to receive the hook B of the next adjoining link. (See Fig. IV.) E is the cross bar or pintle carried by the body of the link and extending across the opening D substantially parallel with hook B (see Fig. I) with which cross bar or pintle E the hook B of the adjoining link engages. (See Fig. IV.)

At that end of the link A which carries the cross bar or pintle E the link is preferably curved, forming wearing faces, cheeks or projections F to engage the sprockets of the wheel.

G are projections or lugs on the link B, preferably curved and forming wearing faces to engage the sprockets of the wheel. The lugs or projections G are located on opposite sides of the link A and are placed at substantially right angles to projections or faces F, as shown.

In placing the links A together to complete a chain the hook B of one link is engaged with the cross bar or pintle E of the next link, and so on throughout the series. In this position the hook B of one link will stand at right angles to the hook of the next link (see Fig. IV) and the projections or faces F of one link will stand substantially parallel to the projections or lugs G of the next link, whereby a space H is formed between F and G on both sides of the chain, into which the sprockets can pass. (See Fig. IV.) When the chain is moving in one direction the projections or lugs G will bear upon the sprockets, while, when the chain moves in the opposite direction the projections or faces F will bear upon the sprockets.

A chain constructed in accordance with the foregoing description is cheap to manufacture, can be readily put together and taken apart, and will co-act with the sprockets of a wheel in an efficient manner.

It will be understood that the projections or wearing faces F, G can be used on links that are connected together otherwise than by the hook B and cross bar E. By having both sets of projections F and G on each link the latter are made interchangeable which would not be the case if one link had projections F and the other link the projections G.

Having thus described my invention, the following is what I claim as new therein and desire to secure by Letters Patent:

1. A chain link consisting of a body portion having a hook at one end and a hook holder at the other end, a sprocket receiving projection or wearing face F formed by the curved end of the link and another sprocket receiving projection, or wearing face projecting at substantially right angles to the hook and extending outwardly a distance greater than the thickness of the hook, on opposite sides only thereof, substantially as described.

2. A chain composed of links connected together and extending at substantially right angles to each other, a projection or wearing face F on one link and a projection or wearing face G on the next link, said projections extending substantially parallel when the links are connected together, and forming between them a space to receive a sprocket substantially as described.

ROBERT J. HAMILL.

Witnesses:
   LYNDEN EVANS,
   DANIEL EVANS.